Sept. 10, 1935.  M. A. TARRANT  2,013,902
PASTRY MIXER
Filed Nov. 15, 1932
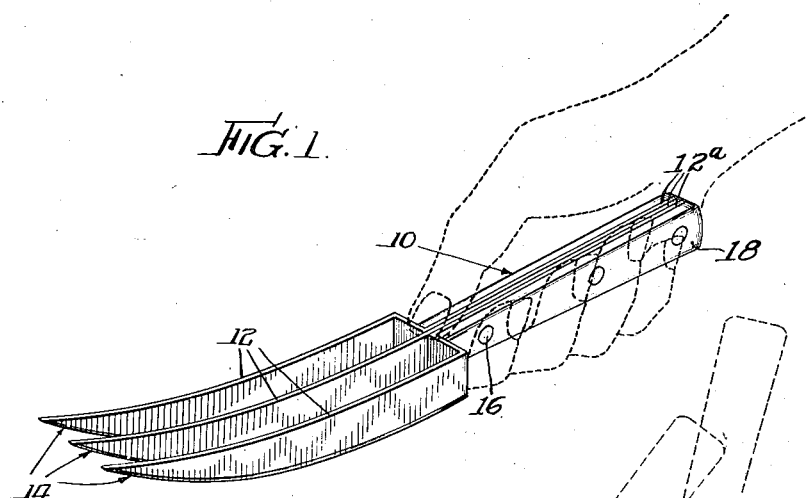
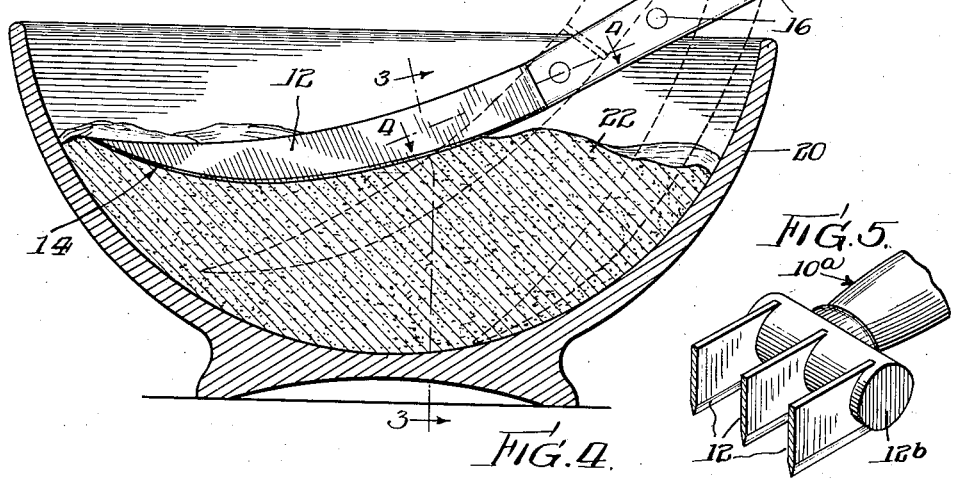
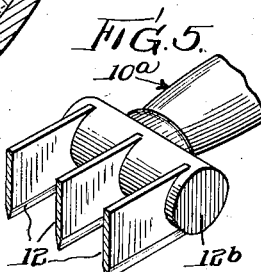
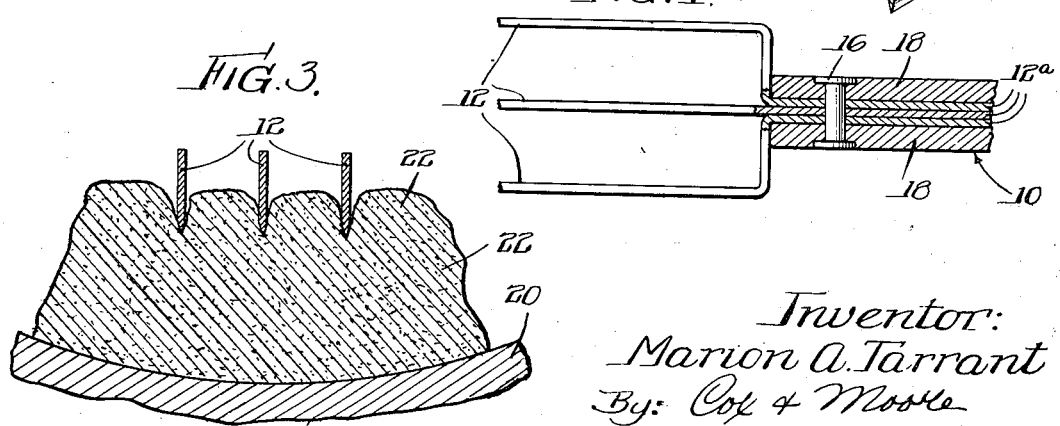
Inventor:
Marion A. Tarrant
By: Cox & Moore
attys.

Patented Sept. 10, 1935

2,013,902

UNITED STATES PATENT OFFICE 2,013,902

PASTRY MIXER

Marion A. Tarrant, Chicago, Ill.

Application November 15, 1932, Serial No. 642,735

2 Claims. (Cl. 259—144)

My invention relates generally to mixers for pastry ingredients, and particularly to devices which are adapted to combine the pastry ingredients so as to maintain the resulting mixture in a light, fluffy state before it is placed in the oven for baking.

One of the difficulties which presents itself in connection with making pastry, such as pie crusts and the like, is that of combining the shortening, such as butter or lard, with the other ingredients. If the flour and other substances are compressed to any extent when the shortening is being combined therewith, the occluded air in the form of small air pockets is forced out, thereby destroying the desired fluffy or light characteristic of the resulting product. Experience has shown that, unless the shortening is combined with the other substances in such a manner as to prevent as far as possible the breaking down of these air pockets, the resulting mixture partakes of a compact plastic nature. When this mixture, from which the occluded air has been separated, is baked in the oven, a pastry structure results which is very undesirable because it lacks that light, delicate characteristic which renders such foods more savory or palatable.

It is one of the primary objects of my present invention to provide a mixing device which enables pastry ingredients to be combined or mixed in such a manner as to prevent the breaking down of the air pockets, or, in other words, which enables the mixture to maintain a fluffy, delicate characteristic.

More specifically, it is an object of my present invention to provide a simple, inexpensive device which may be passed through the pastry ingredients for mixing purposes, for example, for mixing the shortening with the other ingredients without appreciably affecting the fluffy characteristic thereof which it normally possesses prior to the addition of the shortening.

My invention further contemplates the provision of a device which may be manually manipulated with the utmost ease and with a minimum amount of skill, and to this end I propose to provide a plurality of blades extending forwardly from a handle, which is adapted to be conveniently gripped by the user.

Still more specifically, my invention contemplates the provision of a device as set forth above, in which a plurality of knife-like blades are arranged in spaced parallel relationship, and are secured at one extremity to a handle which may be conveniently gripped in such a manner as to enable these blades to sweep through the pastry mixture in a suitable receptacle, such as a mixing bowl, thereby efficiently causing a mixing of the ingredients without affecting the light, fluffy characteristic thereof.

The foregoing and numerous other objects and advantages will be more apparent from the following detailed description when considered in connection with the accompanying drawing, wherein—

Figure 1 is a perspective view of a pastry fluffer or mixer which is representative of one embodiment of my invention, a hand gripping the handle thereof being shown by dotted lines;

Figure 2 is a central cross-sectional view of a bowl containing pastry ingredients, with my improved mixer or fluffer shown in association therewith;

Figure 3 is a fragmentary cross-sectional view disclosing the manner in which the blades of the mixing device enter the mixture of flour and other substances with which the shortening is combined, without subjecting it to any appreciable compression, thereby greatly minimizing the possibility of forcing out the occluded air;

Figure 4 is a fragmentary longitudinal sectional view taken substantially along the line 4—4 of Figure 2, the blades thereof shown in elevation; and Figure 5 is a fragmentary perspective view of a modified construction.

Referring now to the drawing more in detail wherein like numerals have been employed to designate similar parts throughout the various figures, it will be seen that my invention contemplates the provision of a device which includes a handle structure 10 and a plurality of mixing elements or blades 12. These blades 12 in the disclosed embodiment are arranged in substantial parallelism and spaced a suitable distance from each other. The operating or cutting edges 14 thereof are preferably curved as shown in Figures 1 and 2. The outer or free extremities of the blades are preferably pointed and the opposite extremities are formed so as to terminate within the handle structure 10. Suitable rivets 16 cooperate to clamp sections 12a of the blades between a pair of handle strips or blocks 18. Obviously any convenient handle structure may be employed which will serve to secure the blades 12 in their proper spaced relation when the device is in use. In other words, the invention is by no means limited to any particular handle structure, or to any particular shape of blades.

In order to more clearly illustrate the manner in which my improved device may be employed to mix pastry ingredients so as to maintain their desired fluffy, light property, I have disclosed the mixer or fluffer in Figure 2 in combination with a mixing bowl 20. This bowl 20 contains a mixture 22 of pastry ingredients. When the shortening, such as lard or butter, is to be added to the mixture, it is first placed on the top thereof and actually cut into the mixture by employing the blades 12. This can best be observed from Figure 3 wherein I disclose the plates 12 as they are in the process of cutting into the mixture 22. During this process the shortening is gently combined or mixed with the other pastry ingredients without subjecting the mass to any appreciable compression. The blades are preferably swept through the body of the mixture in a substantially vertical plane of operation in the manner indicated in Figure 2, wherein I have disclosed the entering position of the blades by solid lines and successive positions by dotted lines. In this manner the blades 12 may be successively swept through the entire mixture at different locations until the shortening is properly combined or mixed with the other ingredients. The fact that the blades are sufficiently spaced and are sufficiently narrow or thin enables the sweeping, cutting action to take place without subjecting the adjacent body of the mixture to compression. This precludes the air from being forced out, or, in other words, enables the mixture to maintain its airiness. That is to say, by employing my improved device, no working or kneading of the mixture takes place. A pastry mixture differs in this respect from bread dough, in that the latter must, of necessity, be worked or kneaded in order to properly condition it for baking. On the other hand, a pastry mixture, if subjected to such a kneading or working operation when the shortening is combined therewith, would produce a resulting heavy, solid crust, as distinguished from the desired light, fluffy, palatable crust.

By having the edges 14 curved in the manner shown, the device is rendered more practical for use with receptacles, such as the mixing bowl 20, which has a curved inner surface. Furthermore, it enables the user to more readily sweep the blades through the mixture, as indicated in the drawing. That is to say, the sweeping or cutting action may be made without a tiring wrist movement, which is so frequently employed in the culinary art. The sweeping motion might be referred to as a combined sweeping and gentle chopping motion, because as the blades pass through the mixture, they actually chop their way through. In so doing, the shortening gently flows into the crevices thus formed by the blades and is thereby uniformly distributed or dispersed throughout the body of the mixture.

In Figure 5 I have shown a modified blade mounting. This modified construction includes a cylindrical member 12b which provides a mounting for the blades 12 on one side. The opposite side of the member 12b is secured to a handle 10a.

My invention eliminates the necessity of employing the fingers or hands in combining the shortening with the other pastry ingredients. Experience has shown that the compression or kneading which accompanies the use of the fingers in mixing the pastry ingredients tends to lessen the fluffiness of the resulting product. Furthermore, I have found that heat from the hands has a deleterious effect upon the mixture as a whole. Pastry ingredients are mixed while in a cool state and must be maintained in that condition until placed in the oven. In fact, I am familiar with rolling pins for pastry making, which are provided with a central chamber for ice cubes in order to maintain the roller cool when in use. In other words, it is most desirable to keep the mixture as cool as possible until it is placed in the oven for baking. By employing my invention, the hands of the user need not contact with the mixture.

From the foregoing, it will be apparent that my invention contemplates the provision of a pastry mixer or fluffer which is extremely simple in construction and efficient in operation. The structural simplicity of the device is such as to enable the same to be very economically manufactured.

Obviously changes and modifications may be made without departing from the spirit and scope of my invention, and said invention should be limited only by the scope of the appended claims.

Having thus described my invention, what I claim as new and desire to secure by Letters Patent is:

1. A mixer for pastry ingredients comprising an operating handle and a plurality of flat and parallelly disposed mixing blades extending longitudinally from the handle from one end thereof, said blades being widely spaced and relatively thin and lying wholly within the plane of operation of the mixer whereby to avoid compression of the ingredients as the blades are passed therethrough, said blades being longer than the handle and being curved throughout their lengths with the bottom edges of their ends adjacent the handle in line with the bottom of the handle whereby to facilitate the operation of the mixer in a sweeping, cutting stroke.

2. A mixer for pastry ingredients comprising an operating handle and a plurality of flat and parallelly disposed mixing blades extending longitudinally from the handle from one end thereof, said blades being widely spaced and relatively thin and lying wholly within the plane of operation of the mixer whereby to avoid compression of the ingredients as the blades are passed therethrough, said blades being longer than the handle and being curved throughout their lengths with the bottom edges of their ends adjacent the handle in line with the bottom of the handle and their other ends being tapered over a substantial portion of their lengths and terminating in relatively fine points whereby to facilitate the operation of the mixer in a sweeping, cutting stroke.

MARION A. TARRANT.